(12) United States Patent
Dahl et al.

(10) Patent No.: US 11,761,482 B2
(45) Date of Patent: Sep. 19, 2023

(54) ACTUATING DRIVE FOR ADJUSTING A LARGE ROLLING BEARING

(71) Applicant: Liebherr-Components Biberach GmbH, Biberach an der Riss (DE)

(72) Inventors: Martin Dahl, Wettingen (CH); Stephan Kreiner, Ulm (DE); Markus Schuster, Ottobeuren (DE); Thomas Schulze, Schemmerhofen (DE); Klaus Graner, Biberach an der Riss (DE); Andreas Palmer, Riedlingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 392 days.

(21) Appl. No.: 17/091,967

(22) Filed: Nov. 6, 2020

(65) Prior Publication Data
US 2021/0054878 A1    Feb. 25, 2021

Related U.S. Application Data

(63) Continuation of application No. PCT/EP2019/061659, filed on May 7, 2019.

(30) Foreign Application Priority Data

May 7, 2018  (DE) ..................... 10 2018 110 925.3

(51) Int. Cl.
*F16C 19/38* (2006.01)
*F03D 80/70* (2016.01)
(Continued)

(52) U.S. Cl.
CPC .......... *F16C 19/381* (2013.01); *F03D 7/0224* (2013.01); *F03D 80/70* (2016.05);
(Continued)

(58) Field of Classification Search
CPC .... F03D 7/0224; F03D 80/70; F05B 2260/79; F16C 19/381; F16C 19/545;
(Continued)

(56) References Cited

U.S. PATENT DOCUMENTS

| 2,954,830 A | 10/1960 | Gehres |
| 9,121,385 B2 | 9/2015 | Andersen et al. |

(Continued)

FOREIGN PATENT DOCUMENTS

| DE | 202005007450 | 8/2005 |
| DE | 102005026141 | 12/2006 |

(Continued)

*Primary Examiner* — Christopher R Legendre
(74) *Attorney, Agent, or Firm* — Levine Bagade Han LLP

(57) ABSTRACT

An adjusting drive for adjusting the rotational position of a large rolling bearing that comprises two bearing rings that can be rotated relative to each other, having an actuator for rotating the two bearing rings relative to each other. According to the invention, the actuating drive has a ring channel cylinder, which is formed in or on one of the bearing rings of the large rolling bearing, and at least one piston, which is received in the ring channel cylinder in a movable manner and is drivingly connected to the other bearing ring of the two bearing rings.

16 Claims, 3 Drawing Sheets

(51) Int. Cl.
*F03D 7/02* (2006.01)
*F16C 41/00* (2006.01)

(52) U.S. Cl.
CPC ........ *F16C 41/005* (2013.01); *F05B 2260/79* (2013.01); *F16C 2360/31* (2013.01)

(58) Field of Classification Search
CPC .. F16C 2300/14; F16C 2360/31; F16C 41/00; F16C 41/005
See application file for complete search history.

(56) References Cited

U.S. PATENT DOCUMENTS

| | | |
|---|---|---|
| 9,631,605 B2 * | 4/2017 | Neubauer ............. F03D 1/0658 |
| 9,909,567 B2 * | 3/2018 | Frank ..................... F16C 19/505 |
| 2011/0187104 A1 | 8/2011 | Numajiri et al. |
| 2014/0056709 A1 | 2/2014 | Betran Palomas |
| 2021/0054878 A1 * | 2/2021 | Dahl ....................... F16C 41/00 |

FOREIGN PATENT DOCUMENTS

| | | |
|---|---|---|
| DE | 102008013864 | 9/2009 |
| DE | 102015004349 | 9/2016 |
| EP | 2886858 | 6/2015 |
| WO | WO 2013/071936 | 5/2013 |
| WO | WO 2019/215133 | 11/2019 |

\* cited by examiner

ACTUATING DRIVE FOR ADJUSTING A LARGE ROLLING BEARING

CROSS-REFERENCE TO RELATED APPLICATIONS

This application is a continuation of International Patent Application Number PCT/EP2019/061659 filed May 7, 2019, which claims priority to German Patent Application Number DE 10 2018 110 925.3 filed May 7, 2018, the contents of which are incorporated herein by reference in their entireties.

BACKGROUND

The present invention relates to an actuating drive for adjusting the rotary position of a large roller bearing that comprises at least two bearing rings rotatable relative to one another having an actuator for rotating the two bearing rings relative to one another.

Two solutions have essentially prevailed in the industry with respect to the adjustment of the rotary position of the bearing rings of large roller bearings or of the system components installed thereon. On the one hand, it is an electrical adjustment by means of an e-motor, transmission, and ring gear at the bearing. On the other hand, it is a hydraulic adjustment by means of one or two cylinders that are supported at one bearing ring or at the connection construction and that eccentrically press via one or more piston rods onto a disk that is connected to the other bearing ring.

In the current solutions with a cylinder, the adjustment torque generated is not constant since the lever arm varies with the pivot angle. The cylinder force in the classical differential cylinder is further dependent on the direction since the piston surface and the piston rod surface have different sizes.

Such actuating drives are used In modern wind turbines, for example, in which the rotor blades are supported at the rotor hub respectively rotatable by means of a large roller bearing about the longitudinal rotor blade axis to be able to vary the pitch angle of the rotor blades in dependence on the wind speed. This pitch angle, i.e. the angle of inclination abut the longitudinal rotor blade axis, can here be set electrically in the said manner, with an electric motor, a transmission, and a ring gear being attached to the roller bearing on an electrical pitch adjustment. The pinion driven by the electric motor meshes with the ring gear to rotate the two bearing rings with respect to one another in this manner and to hereby set the pitch angle.

On the other hand, it is also known to set the pitch angle hydraulically. One or two hydraulic cylinders are provided here that are supported at the hub or at the bearing ring that is connected to the hub, with the piston rods being eccentrically connected to a disk that is connected to the rotor blade via the second bearing ring so that a rotation of the two bearing rings and thereby a setting of the pitch angle can be achieved by retracting and extending the piston rod.

Since such actuating drives for the setting of the pitch angle, for example, but also in other applications, often remain in the same position over a longer time and hold the bearing rings, for example the rotor blade, at the once set angle of rotation, the actuating drives are subject to special demands. Lubrication problems, for example, result with said electrical pitch adjustments since the pinion often does not move with respect to the ring gear for a longer time and the lubricant cannot be distributed. With said hydraulic pitch adjustments, the adjustment torque generated is typically not constant and also dependent on the direction since, on the one hand, the lever arm of the hydraulic cylinder or of its piston rod, varies with the pivot angle and, on the other hand, as mentioned, the piston surface and the piston rod surface are of different sizes. It has already been considered to this extent to correspondingly control the hydraulic pressure for the compensation of the different adjustment forces, which is, however, very complex and/or expensive.

In addition to said problems, there is the special problem with large roller bearings that the effort for dismantling is particularly large and the handling is difficult in this respect. Such large roller bearings have bearing rings having diameters of more than 1 m and often also of a plurality of meters so that the weight alone of the large roller bearing itself already represents a challenge in handling. For the example of a wind turbine in which the rotor blades are rotatably installed at the hub via large roller bearings, not only the effort for dismantling the bearing ring is very large in the event of a defect, but the handling of the rotor blades that have to be removed in so doing is also very difficult in the dismantling and the reinstalling.

The replacement of subcomponents of the large roller bearing and of the actuating drive, specifically of the seals, is also problematic here. It would be helpful to enable such a subcomponent replacement where possible without dismantling the large roller bearing.

It is furthermore also problematic that the rolling elements of a large roller bearing wear in the course of their service life. This produces additional play between the inner ring and the outer ring of the large roller bearing and represents a special challenge for the function of the subcomponents of the large roller bearing. The movements of the bearing rings with respect to one another as a consequence of this play have to be borne by components that are in engagement with both bearing rings. This can in particular result in very fast destruction of said subcomponents such as the seals.

It is the underlying object of the present invention to provide an improved actuating drive for a large roller bearing which can avoid disadvantages of the prior art and further develop the latter in an advantageous manner. A service-friendly actuating drive that is compact is construction should in particular be provided for a large roller bearing that enables a servicing of subcomponents without a complete dismantling of the large roller bearing, is resistant to wear of the rolling elements and to play thereby produced, and can achieve equally large, constant adjustment actuating torques independently of the direction in so doing without requiring a complex pressure control for this purpose.

SUMMARY

Said object is achieved in accordance with the invention by an actuating drive in accordance with claim 1. Preferred embodiments of the invention are the subject of the dependent claims.

It is therefore proposed to integrate the actuating drive in the large roller bearing and to relocate the piston of the actuating drive into an annular groove in or at one of the bearing rings so that the piston can be adjusted on an arcuate trajectory and thus without changing the lever arm. In accordance with the invention, the actuating drive comprises an annular groove cylinder that is formed in or at one of the bearing rings and at least one piston that is displaceably received in the annular groove cylinder and that is drivewise connected to the other one of the two bearing rings. If the piston in the annular groove cylinder is pressurized by a pressure medium, the piston travels in the annular groove cylinder of the one bearing ring and in so doing takes along the other bearing ring via said drive connection so that a rotation of the two bearing rings and thus an adjustment of the pitch angle occurs. In this respect, not only the lever arm of the piston and thus the generated torque remains constant, but the piston can also have piston surfaces of the same size on oppositely disposed sides so that the same adjustment force and thus the same adjustment torque is generated independently of the direction. The piston does not perform any linear movement in so doing, but rather a movement on a curve having a constant radius. The annular groove cylinder is a synchronizing cylinder due to the fact that the piston can manage without a piston rod. There is thus no oscillating volume and the adjustment force of the annular groove cylinder is not direction dependent.

To protect the annular groove and/or the piston running therein from damage and wear, that can come from the wear of the rolling elements and from accompanying bearing play of the bearing rings of the large roller bearing, a decoupling of the play from the inner and outer rings of the large roller bearing can be provided at at least half the annular groove cylinder. The drive connection of the piston to the bearing ring to which the piston is not travelable or that is rotationally taken along by the piston can in particular be designed as yielding and/or as compensating bearing play so that said drive connection does not have to take up the bearing forces when the bearing rings have play with respect to one another.

The drive connection of the piston(s) to the bearing ring to be taken along can in particular be formed as movable and/or yielding, in particular subject to play, in the axial direction to be able to at least partially compensate axial bearing play of the bearing rings of the large roller bearing. Movable in the axial direction here means a movability in parallel with the axis of rotation of the large roller bearing. This can be implemented, for example, by one or more pins that can each move axially in a bore in the driving ring and/or in the bearing ring that is taken along. A further possibility is a spur toothing by which axial movability can be achieved.

Alternatively or additionally, said drive connection can be s movable and/or yielding, in particular subject to play, in the radial direction to be able to at least partially compensate radial bearing play of the bearing rings of the large roller bearing. Movable in the radial direction here means a movability perpendicular to the axis of rotation of the large roller bearing. This can be implemented, for example in a pin connection, by radial elongate holes in which the pins are radially movable. Such elongate holes can be provided in the driving ring and/or in the bearing ring that is taken along. A toothed arrangement can equally be provided and can be produced such that a radial toothing play is made possible and can at least partially compensate radial play of the bearing rings.

Said drive connection can be provided at the total circumference or only in partial regions. Said driving ring can, for example, have peripherally radially projecting sections at which the connection means to the bearing ring to be taken along are attached. The sections to which the connection means to the bearing ring to be taken along are attached are advantageously attached in the peripheral direction at the sectors or ring sections at which the pistons are seated and are connected to the driving ring.

Said drive connection is advantageously implemented in shape matched or force transmitting form in the peripheral direction, for example by means of pin connections and/or groove connections.

Said drive connection is advantageously formed substantially free of play in the peripheral direction to be able to achieve an exact setting and/or holding of a desired angle of rotation of the large roller bearing.

A plurality of pistons can advantageously be provided and can be respectively received in an annular groove cylinder, with the plurality of pistons being able to be drive-wise connected to the respective other bearing ring. Relatively high actuating forces can be generated by such a plurality of pistons with relatively small piston diameters.

The piston diameter can be reduced in size by the use of a plurality of pistons in the annular groove and the surface that is acted on by the pressure and that is decisive for the force that presses the shells of the annular groove cylinder apart can also be reduced in size.

To have a particularly compact design, the plurality of pistons can be received in the same annular groove cylinder or in different sections of the common annular groove cylinder. The sections of the annular groove cylinder can here be separated from one another by partition walls so that the pressure that displaces the piston can be supported at the partition walls.

It would, however, alternatively also be possible to provide a plurality of annular groove cylinders in one bearing ring or also in both bearing rings so that every piston or every piston group has its own annular groove cylinder. In the sense of a simple, compact, and space saving construction, one annular groove cylinder can, however, be sufficient in which a plurality of pistons can run.

To enable a simple maintenance of the annular groove cylinder, the annular groove or the annular body and/or the cylinder body surrounding the annular groove can be designed as split. The annular groove can in particular be approximately centrally divided viewed in cross-section so that a piston inserted into the annular groove can be removed from both annular groove parts transversely to the longitudinal piston axis and/or to the longitudinal annular groove axis without being caught at undercut margins of the annular groove parts. The annular groove body and/or the cylinder body can be split into two half rings that each have an annular furrow and together form the annular groove in the state set against one another.

The annular groove body surrounding the annular groove in which the annular groove is formed advantageously has a dividing plane in parallel with the trajectory of the piston and/or substantially perpendicular to the axis of rotation of the large roller bearing. The annular groove cylinder can hereby be dismantled particularly simply.

One of the annular groove parts can here be integrated in one of the two bearing rings of the large roller bearing, for example in that the respective bearing ring has a furrow at a wall side that is embedded therein. Alternatively, said annular groove part can, however, also be screwed onto the bearing ring as a separate ring or can be fixed thereto in a different manner, preferably by shape matching or force transmission.

Said annular groove part or the total annular groove can advantageously be arranged at an axial front face of the respective bearing ring. An arrangement at a jacket surface of the bearing ring could admittedly also be considered, but an arrangement at the axial front face is simple to achieve and to dismantle and enables a simple connection of the piston to the other bearing ring of the large roller bearing.

The other annular groove part or the second half of the annular groove body can advantageously be an additional, separate part, for example in the form of an annular groove cover that is advantageously releasably connected to the bearing ring and/or to the first-named annular groove part, preferably via an additional screw connection, with the connection being able to be shaped matched and/or force transmitting. It is advantageous here if the annular groove cover is supported at the bearing ring via the bearing screw connection to keep the bending strain in the additional screw connection as small as possible.

The annular groove is advantageously formed and attached to the bearing ring such that the annular groove cylinder can be dismantled in a service case without releasing the bearing screw connections. Peripheral seals at the annular groove and/or piston seals and/or the pistons themselves can then be replaced, for example.

To enable a simple dismantling of the annular groove cover or of the separable annular groove part and of the at least one piston, the piston can be releasably connected to a driving ring, preferably by means of a screw connection and/or a pinning and/or toothed arrangement. Independently of the releasability, the connection between the piston and the driving ring can advantageously be shape matched and/or force transmitting, with a connection with material continuity also generally being able to be considered, however.

The shape matched and/or force transmitting connection means can here advantageously be formed such that they can be released or joined together in a direction substantially perpendicular to said dividing plane between the annular groove parts and/or in parallel with the joining direction of the two annular groove parts. If, for example, said annular groove cover can be removed in a direction in parallel with the axis of rotation of the large roller bearing, it can be advantageous if the shape matched and/or force transmitting connection means between the piston and the driving ring can also be released and conversely brought into engagement again in parallel with the axis of rotation of the large roller bearing. Pins can, for example, be provided as connectors whose longitudinal axes extend in parallel with the axis of rotation of the longitudinal axis; alternatively, a toothed arrangement can be provided whose tooth flanks extend approximately in parallel with the axis of rotation of the large roller bearing.

The two bearing rings of the large roller bearing are advantageously supported against one another by at least two axial roller bearing rows, with the axial roller bearing rows advantageously being able to be arranged on oppositely disposed sides of an annular section or of an annular nose so that the two bearing rings are supported against one another in both axial directions, i.e. with an upright arrangement of the axis of rotation of the bearing, the one bearing ring is supported both downwardly and upwardly at the other bearing ring. The one bearing ring can so-to-say be clamped between the two axial roller bearings.

In an advantageous further development of the invention, the at least one annular groove cylinder—observed in cross-section of the large roller bearing—can be arranged not between the two or all the axial roller bearing rows, but rather axially outside or on a side thereof. With an upright arrangement of the bearing axis of rotation, the two axial bearings or all the axial bearings can be arranged beneath the annular groove cylinder. The annular groove cylinder is exposed less to the bearing forces due to an arrangement of the annular groove cylinder outside the region into which the rolling elements introduce the transmitted force flow into the bearing rings.

Independently of this, a cross-sectional overlap can be provided between the axial roller bearings, on the one hand, and the annular groove cylinder, on the other hand. If, viewed in cross-section, a straight line is placed through the annular groove cylinder that extends in parallel with the bearing axis of rotation, said straight line impinges at least one of said axial bearings.

On the other hand, a certain diameter offset between the axial bearings, on the one hand, and the annular groove cylinder, on the other hand, can by all means be sensible. If the mean diameters of the axial roller bearing rows and of the annular groove cylinder are looked at, they can have dimensions of different sizes, for example such that the mean diameter of the annular groove cylinder approximately corresponds to the outer diameter of the axial roller bearing rows or to the inner diameter of the axial roller bearing rows, depending on whether the annular groove cylinder is provided in the inner ring or in the outer ring.

In a further development of the invention, the annular groove cylinder can be formed at/in the inner ring. It would, however, generally also be possible to provide the annular groove cylinder at/in the outer ring.

The two aforesaid axial roller bearings can have substantially the same diameters.

In addition to said axial roller bearings, the two bearing rings can advantageously also be supported against one another by at least one radial roller bearing row, with said radial roller bearing row advantageously being able to be arranged between the two axial roller bearing rows.

Said at least one radial bearing can in particular be arranged in a diameter region that at least partially overlaps the diameter region of the annular groove or is adjacent thereto or adjoins it. The diameter region of the radial bearing can advantageously amount to 75% to 125% or 85% to 115% of the diameter region of the annular groove.

The bearing ring comprising the annular groove cylinder can advantageously be formed in two parts or in multiple parts. Alternatively or additionally, the other bearing ring to be taken along by the piston can also be formed as split. The split bearing ring can in particular be divided in a plane substantially perpendicular to the axis of rotation of the large roller bearing.

The aforesaid driver can extend substantially radially from the annular groove cylinder starting from the annular groove body and/or can project radially over said bearing ring to be drive-wise connected to the other bearing ring. If the annular groove cylinder is provided in the inner ring, said driver can extend radially outwardly toward the outer ring.

To seal the annular groove cylinder, different seals can be provided between the two bearing ring parts. A static seal can in particular be provided on one side of the annular groove cylinder and/or one or more slide seals can be provided on another side of the annular groove cylinder that seal the bearing ring parts against said driver.

Said seals can advantageously be designed as working axially, i.e. can press onto the radially extending sealing surfaces in an axial direction.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
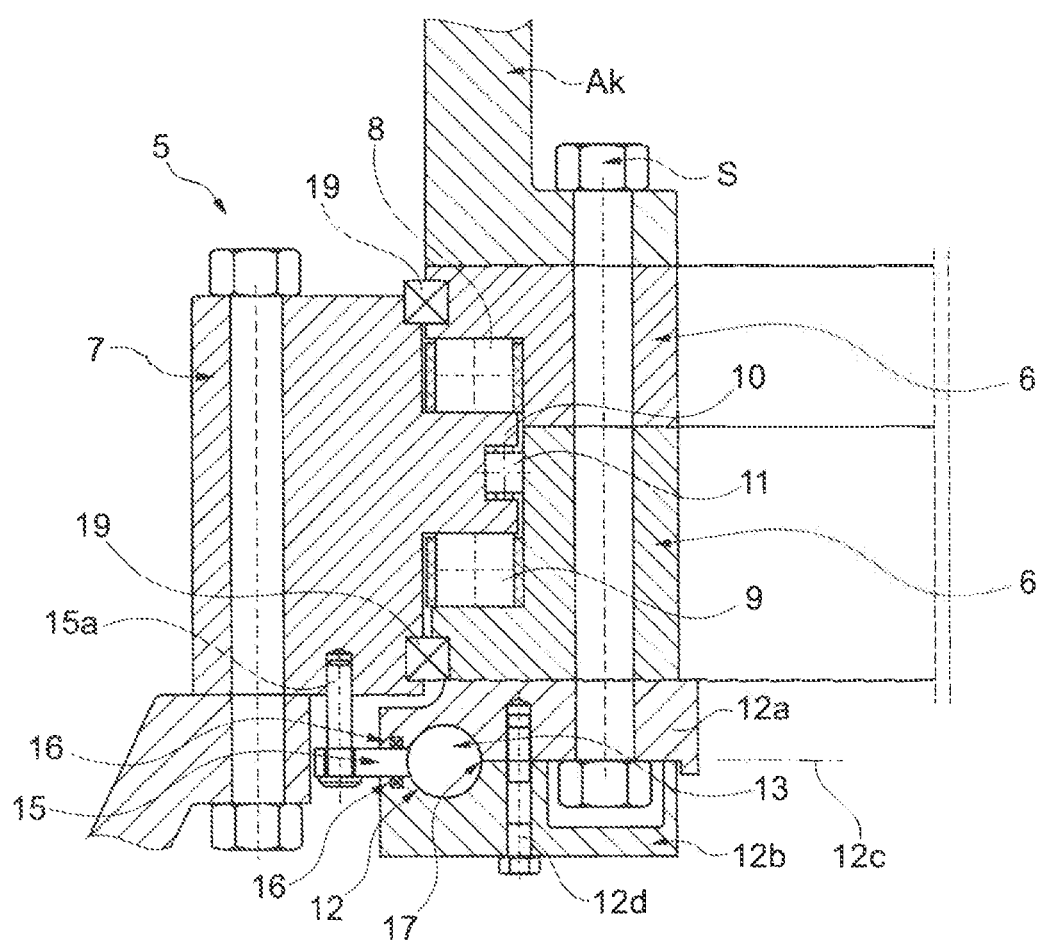
FIG. 1: a sectional view of an actuating drive through the two bearing rings of the large roller bearing in accordance with an advantageous embodiment of the invention that shows the arrangement of the roller bearing rows and of the annular groove cylinder as well as of the seals for sealing the annular groove cylinder.

As FIG. 1 shows, the large roller bearing 5 comprises two bearing rings 6 and 7 that are arranged concentrically toward one another and are rotatable against one another.

The two bearing rings 6 and 7 can advantageously be supported rotatably against one another by a plurality of roller bearing rows. On the one hand, two axial roller bearing rows 8 and 9 are advantageously provided here that can, for example, be formed as cylinder roller bearings.

The two axial roller bearing rows 8 and 9 support the two bearing rings 6 and 7 at one another in opposite directions. One of the bearing rings, for example the bearing ring 7—can in particular have a ring nose 10 that projects toward the other bearing ring 6 and that is axially clamped at the other bearing ring 6 by the two axial roller bearing rows 8 and 9 or is supported in opposite directions. The other bearing ring 6 can have an annular groove for this purpose into which said ring nose 10 engages.

The two bearing rings 6 and 7 can furthermore be supported at one another by at least one radial roller bearing row 11 that can, for example, likewise be configured as a cylinder roller bearing.

Multi-row roller bearings can also be provided instead of the shown single-row roller bearing.

As FIG. 1 shows, the radial roller bearing 11 can advantageously be arranged between the two axial roller bearings 8 and 9, in particular in the gap between the aforesaid ring nose 10 and the annular groove accommodating the ring nose 10.

As FIG. 1 shows, one of the bearing rings, in particular the inner bearing ring 6, is provided with an annular groove cylinder 12 that extends arcuately at an axial front face, for example at the lower front face, of the bearing ring 6 and forms a pressure medium cylinder in which one or more pistons 13, 14 are displaceably received. The annular groove 12 is advantageously arranged at the front face of the bearing ring 6 that is disposed opposite the connection construction AK fastened to this bearing ring 6 or opposite the front face at which the connection construction AK is connected to the bearing ring 6.

Figure 2:
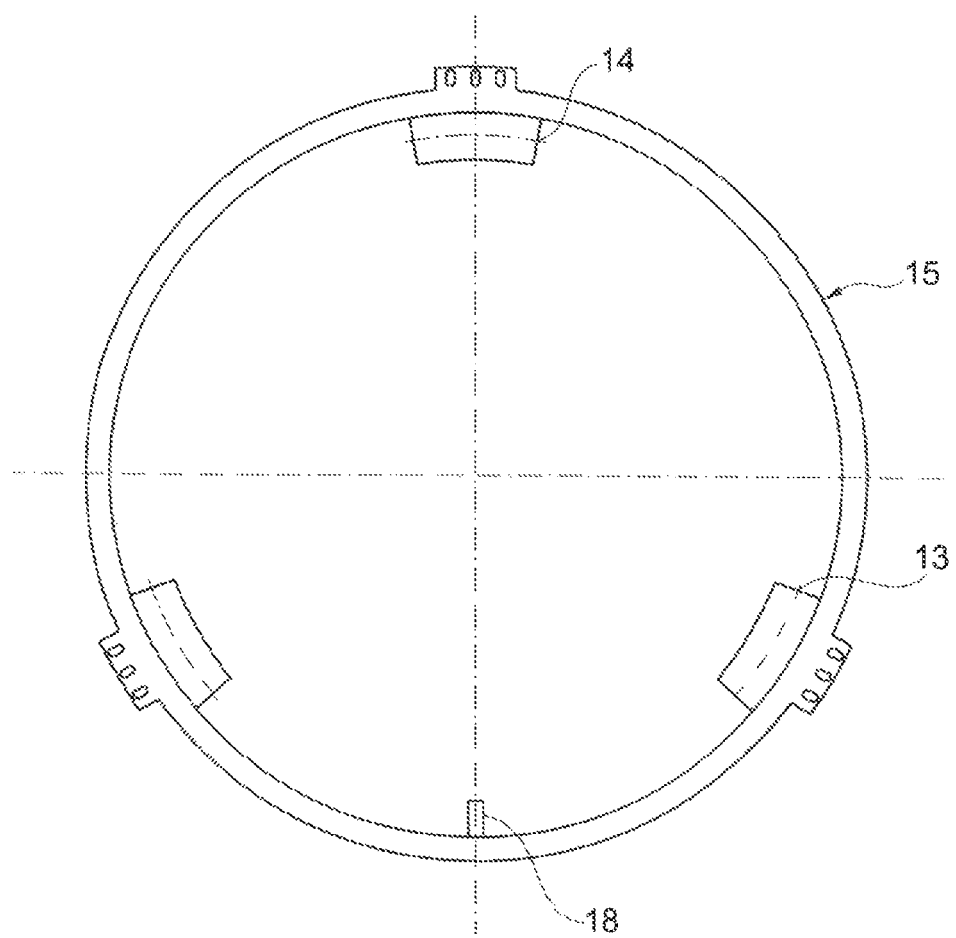
FIG. 2: a plan view of the large roller bearing of FIG. 1.

As FIG. 2 indicates, the piston 13 and 14 can likewise be slightly arcuately curved or can have a lightly arcuately curved longitudinal axis to be able to slide smoothly and without resistance along the arcuately curved annular groove cylinder contour.

As FIG. 1 shows, the bearing ring 6 having the annular groove cylinder 12 can be formed in two parts or in multiple parts, with the dividing plane being able to extend through the furrow in which the ring nose that is provided at the other ring engages and that is supported by the two axial roller bearings 8, 9. The two bearing ring parts can be axially screwed to one another by bolts S.

To enable a simple maintenance of the annular groove cylinder, the annular groove cylinder 12 or the annular body and/or the cylinder body 12a, 12b surrounding the annular groove can be designed as split. The annular groove can in particular be approximately centrally divided viewed in cross-section so that the pistons 13, 14 inserted into the annular groove can be removed from both annular groove parts transversely without being caught at undercut margins. The annular groove body and/or the cylinder body can be split into two half rings 12a, 12b that each have an annular furrow and together form the annular groove in the state set against one another.

The annular body 12a, 12b that surrounds the annular groove and in which the annular groove is formed advantageously has a dividing plane 12c in parallel with the trajectory of the pistons 13, 14 and/or substantially perpendicular to the axis of rotation of the large roller bearing. The annular groove cylinder 12 can hereby be dismantled particularly simply.

One of the annular groove parts 12a can be screwed as a separate ring onto the bearing ring 6 or can be fixed thereat in a different manner, in particular as explained at its axial front side.

The other annular groove part 12b or the second half can advantageously be an additional, separate part, for example in the form of an annular groove cover that is advantageously releasably connected to the bearing ring 6 and/or to the first-named annular groove part 12, preferably via an additional screw connection 12d. It is advantageous here if the annular groove cover 12b is supported at the bearing ring 6 via the bearing screw connection, cf. FIG. 1, to keep the bending strain at the additional screw connection as small as possible.

In the service case, the annular groove cylinder 12 can advantageously be dismantled without releasing the bearing screw connections S. Peripheral seals at the annular groove and/or piston seals and/or the pistons 13, 14 themselves can then be replaced, for example.

To enable a simple dismantling of the annular groove cover 12b or of the separable annular groove part and of the pistons 13, 14, the pistons 13, 14 can be connected to a driving ring 15 in a shape matched and/or force transmitting manner, preferably by means of a screw connection and/or a pinning and/or toothed arrangement.

To protect the annular groove and/or the pistons 13, 14 running therein from damage as a result of wear of the rolling elements and from accompanying bearing play of the bearing rings 6, 7 of the large roller bearing 5, a decoupling of the play from the inner and outer rings 6, 7 of the large roller bearing 5 can be provided at at least one half of the annular groove cylinder. The drive connection of the pistons 13, 14 to the bearing ring 7 to which the pistons 13 14 cannot be traveled or that cannot be rotationally taken along by the pistons 13, 14 can in particular be formed as yielding and/or as compensating bearing play. The drive connection can here be formed in such a way as yielding and/or as compensating bearing play in the region of said driver 15 and/or of its connection to the bearing ring 7 to be taken along and/or to the pistons 13, 14.

The drive connection of the pistons 13, 14 to the bearing ring 7 to be taken along can in particular be formed as movable and/or yielding, in particular subject to play, in the axial direction to be able to at least partially compensate axial bearing play of the bearing rings 6, 7 of the large roller bearing 5. This can be implemented, for example, by one or more pins 15a that can each move axially in a bore in the driving ring 15 and/or in the bearing ring 7 that is taken along. A further possibility is a spur toothing by which the desired axial movability can be achieved.

Alternatively or additionally, said drive connection can be formed as movable and/or yielding, in particular subject to play, in the radial direction to be able to at least partially compensate radial bearing play of the bearing rings 6, 7 of the large roller bearing 5. This can be implemented, for example, in a pin connection through radial elongate holes in which the pins 15a are radially movable. Such elongate holes can be provided in the driving ring 15 and/or in the bearing ring 7 that is taken along. A toothed arrangement can equally be provided and can be produced such that a radial play is made possible.

As FIG. 1 shows, the at least one annular groove cylinder 12—observed in cross-section of the large roller bearing 5—can be arranged not between the two or all the axial roller bearing rows 8, 9, but rather axially outside or on a side thereof. With an upright arrangement of the bearing axis of rotation, the two axial bearings 8, 9 or all the axial bearings 8, 9 can be arranged above the annular groove cylinder 12. or all the axial bearings 8, 9 can be arranged beneath the annular groove cylinder 12

Independently of this, a cross-sectional overlap can be provided between the axial roller bearings 8, 9, on the one hand, and the annular groove cylinder 12, on the other hand. If, viewed in cross-section, a straight line is placed through the annular groove cylinder 12 that extends in parallel with the bearing axis of rotation, said straight line impinges at least one of said axial bearings 8, 9.

The annular groove cylinder 12 is not fully closed toward the other bearing ring 7, but a radially extending gap is rather provided in which said driver 15 is arranged that extends starting from the annular groove cylinder 12 out of it or radially projecting beyond the bearing ring 6 toward the other bearing ring 7. Said driver 15 can be formed in plate-form and can be seated with an exact fit in the gap between the two bearing ring parts 12a and 12b so that the annular groove cylinder 12 can also be inwardly sealed by the driver 15.

As FIG. 1 shows, sliding seals 16 that seal the annular groove body parts 12a and 12b toward said driver 15 can be provided at the two annular groove body parts 12a and 12b. A static seal 17 that seals the annular groove cylinder 12 in the dividing plane of the two annular groove body parts 12a and 12b can furthermore be provided on another side of the annular groove cylinder 12.

Said seals 16 and 17 can be formed as working axially and can develop their sealing effect when the two annular groove body parts 12a and 12b are axially tensioned toward one another, for example by corresponding clamping bolts.

As FIG. 1 furthermore shows, further seals 19 can be provided between the bearing rings 6, 7 to seal the bearing gap between the two bearing rings 6, 7 in which the roller bearing rows 8, 9, 11 are seated. The explained annular groove cylinder 12 is advantageously arranged outside the bearing gap sealed by the seals 19 so that the annular groove cylinder is accessible and can be dismantled without having to dismantle the seals 19.

As FIG. 2 indicates, separating pistons 18 or separating walls that divide the annular groove cylinder 12 into a plurality of annular groove cylinder sections are furthermore seated in the annular groove cylinder 12. The pressure that serves the traveling of the pistons 13 and 14 is supported against said separating pistons or separating walls 18.

Said separating pistons or separating walls 18 can be provided with a pressure medium feed and/or a pressure medium outlet to be able to introduce and drain pressure medium into and out of the sections of the annular groove cylinder.

Alternatively or additionally, a pressure medium feed and/or a pressure medium outlet can also be provided in the driver 15 and/or in one of the annular groove cylinder body parts 12a, 12b, advantageously in said annular groove cover 12b, to be able to introduce and drain pressure medium into and out of the annular groove cylinder 12 or into and out of the sections of the annular groove cylinder 12.

If, for example, pressure medium is supplied into a right chamber toward the piston 14, said piston 14 travels to the left or counter-clockwise. In so doing, it takes along the outer ring 7 via the driver 15 so that the two bearing rings 6 and 7 are rotated against one another.

Figure 3:
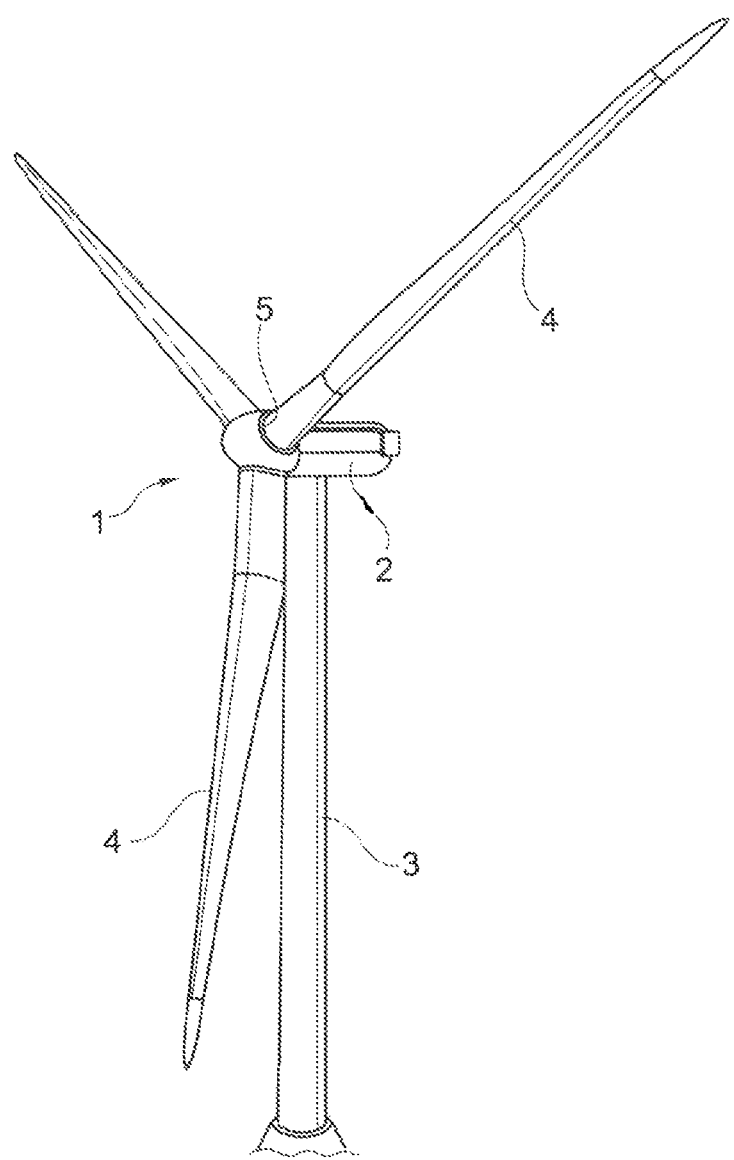
FIG. 3: a schematic front view of a wind turbine at whose rotor hub a plurality of rotor blades are arranged whose pitch angles are adjustable, with the rotor blades each being rotatably supported at the respective rotor hub by means of a large roller bearing in accordance with FIGS. 1 and 2 and whose pitch angle can be set by means of the actuating drive integrated in the large roller bearing.

The actuating drive or the described large roller bearing can be used, for example, to adjustably support the rotor blades of a wind turbine at its rotor hub. As FIG. 3 shows, such a wind turbine 1 can comprise in a manner known per se a tower 3 on which a nacelle 2 is arranged rotatably about an upright axis. The generator and other system components can be accommodated in said nacelle 2.

A plurality of rotor blades 4 are arranged at the rotor hub and are supported at said rotor hub rotatably about their longitudinal axes, i.e. variably in their pitch angles.

Said rotor blades 4 are here supported at the rotor hub by a large roller bearing such as is shown in FIGS. 1 and 2.

The one bearing ring is here fixedly connected to the rotor blade 4 while the other bearing ring is fastened to the rotor hub. The rotor blade can here advantageously be fastened to the inner ring 6 and the rotor hub to the outer ring 7, with in principle, however, the reverse arrangement also being possible.

The large roller bearing and the actuating drive integrated therein can, however, also be used for other machine components to be adjusted, for example to be able to rotate the superstructure of a crane or excavator with respect to its undercarriage.

We claim:

1. An actuating drive for adjusting a rotational position of a large roller bearing having at least two bearing rings configured to be rotated with respect to one another,
   an annular groove cylinder in or at a first bearing ring of the at least two bearing rings, wherein the annular groove cylinder is interrupted at least once at a periphery and is provided at both sides of the interruption with a feed for hydraulic fluid, and
   at least one piston displaceably received in the annular groove cylinder, wherein the at least one piston is drive-wise connected to a second bearing ring of the at least two bearing rings via a driving disk running around at least in a sealing gap of the annular groove cylinder,
   wherein a connection of the driving disk to the second bearing ring is free of play-in a peripheral direction or is subject to play in axial and radial directions.

2. The actuating drive of claim 1, wherein the connection comprises a pin connection with pins axially and/or radially displaceably guided at the second bearing ring and/or at the driving disk.

3. The actuating drive of claim 1, wherein the annular groove cylinder is located at a front face of an axial front face of one of the at least two bearing rings.

4. The actuating drive of claim 3, wherein an annular groove cylinder body surrounding the annular groove cylinder comprises annular groove cylinder body parts, and wherein the annular groove cylinder has a dividing plane parallel with a trajectory of the at least one piston and that passes centrally through the annular groove cylinder viewed in cross-section.

5. The actuating drive of claim 4, wherein a first annular groove cylinder body part of the annular groove cylinder body parts is integrated with the first bearing ring or is fastened to the first bearing ring as a separate ring.

6. The actuating drive of claim 5, wherein an annular groove cover comprises a second annular groove cylinder body part of the annular groove cylinder body parts, and wherein the annular groove cover is releasably connected to the first bearing ring and/or to the first annular groove cylinder part.

7. The actuating drive of claim 4, wherein the annular groove cylinder body parts are sealed on a first side of the annular groove cylinder by a static seal and are sealed on a second side of the annular groove cylinder by a sliding seal against a driving disk that is connected to the at least one piston.

8. The actuating drive of claim 7, wherein the static seal acts axial and/or wherein the sliding seal acts axially.

9. The actuating drive of claim 1, wherein the annular groove cylinder is defined by an annular groove cylinder body that is attached to the first bearing ring such that in a service case the annular groove cylinder body is at least partly dismantlable without releasing the at least two bearing rings from one another and/or releasing the large roller bearing from an installation environment.

10. The actuating drive of claim 1, wherein the at least two bearing rings are supported against one another by at least two axial roller bearings, and wherein the at least two axial roller bearings, viewed in cross section, are on the same side of the annular groove cylinder.

11. The actuating drive of claim 10, wherein the annular groove cylinder and the at least two axial roller bearings define mutually overlapping diameter regions.

12. The actuating drive of claim 1, wherein the at least two bearing rings are supported against one another by a radial roller bearing.

13. The actuating drive of claim 12, wherein the radial roller bearing is between two axial roller bearings.

14. The actuating drive of claim 12, wherein the radial roller bearing is in a diameter region that is 75% to 125% of a diameter region of the annular groove cylinder.

15. The actuating drive of claim 1, wherein seals for sealing a bearing gap between the at least two bearing rings in which roller bearing rows are seated are provided between the at least two bearing rings, and wherein the annular groove cylinder is outside the bearing gap such that the annular groove cylinder is accessible and dismantlable without dismantling the seals.

16. A wind turbine comprising a rotor having a plurality of rotor blades, wherein the rotor blades are each fastened to a rotor hub of the rotor by the actuating drive of claim 1, and wherein the rotor blades have adjustable pitch angles.

* * * * *